United States Patent [19]

Bertin et al.

[11] Patent Number: 5,606,669
[45] Date of Patent: Feb. 25, 1997

[54] SYSTEM FOR MANAGING TOPOLOGY OF A NETWORK IN SPANNING TREE DATA STRUCTURE BY MAINTAINING LINK TABLE AND PARENT TABLE IN EACH NETWORK NODE

[75] Inventors: Olivier Bertin, Nice; Jean-Paul Chobert, Carros; Alain Pruvost, Valauris, all of France

[73] Assignee: International Business Machines Corporation, Armonk, N.Y.

[21] Appl. No.: 447,999

[22] Filed: May 23, 1995

[30] Foreign Application Priority Data

May 25, 1994 [EP] European Pat. Off. ............. 94480048

[51] Int. Cl.⁶ ........................................ G06F 13/00
[52] U.S. Cl. ............................. 395/200.15; 395/200.02
[58] Field of Search ..................... 395/200.01, 200.15, 395/200.02; 370/94.3, 94.2, 94.1

[56] References Cited

U.S. PATENT DOCUMENTS

| | | | |
|---|---|---|---|
| 4,905,233 | 2/1990 | Cain et al. | 370/94.1 |
| 5,079,767 | 1/1992 | Perlman | 370/94.3 |
| 5,138,615 | 8/1992 | Lamport et al. | 370/94.3 |
| 5,245,609 | 9/1993 | Ofek et al. | 370/94.3 |

FOREIGN PATENT DOCUMENTS 0404423  12/1990  European Pat. Off. .

OTHER PUBLICATIONS

IBM Technical Disclosure Bulletin vol. 35, No. 1B, Jun. 1992, New York US pp. 16–18 'Distributed Tree Maintenance'.
IBM Technical Disclosure Bulletin vol. 35, No. 1A, Jun. 1992, New York US pp. 93–98 'Distributed Tree Maintenance'.

Primary Examiner—Thomas C. Lee
Assistant Examiner—Le Hien Luu
Attorney, Agent, or Firm—Gerald R. Woods

[57] ABSTRACT

A topology manager within a data communication network including a number of nodes interconnected by bi-directional links, wherein each said node is provided with means for dynamically setting and storing within the node a full topology database including full parent-node-relationship references. The system is is capable of fast path determination and fast spanning tree recovery based on the topology database contents.

8 Claims, 9 Drawing Sheets

SYSTEM FOR MANAGING TOPOLOGY OF A NETWORK IN SPANNING TREE DATA STRUCTURE BY MAINTAINING LINK TABLE AND PARENT TABLE IN EACH NETWORK NODE

FIELD OF THE INVENTION

This invention generally deals with data communication networks and more particularly with a so-called Spanning Tree data structure enabling optimized network operation in a number of situations including fast path determination and fast spanning tree recovery. More specifically, the invention deals with a method and means for dynamically organizing each node's spanning tree node data structure to fully reflect the tree topology, as well as a method and means for using the organized node's data structure to implement network operations such as fast path determination or fast spanning tree recovery.

BACKGROUND OF THE INVENTION

Figure 1:
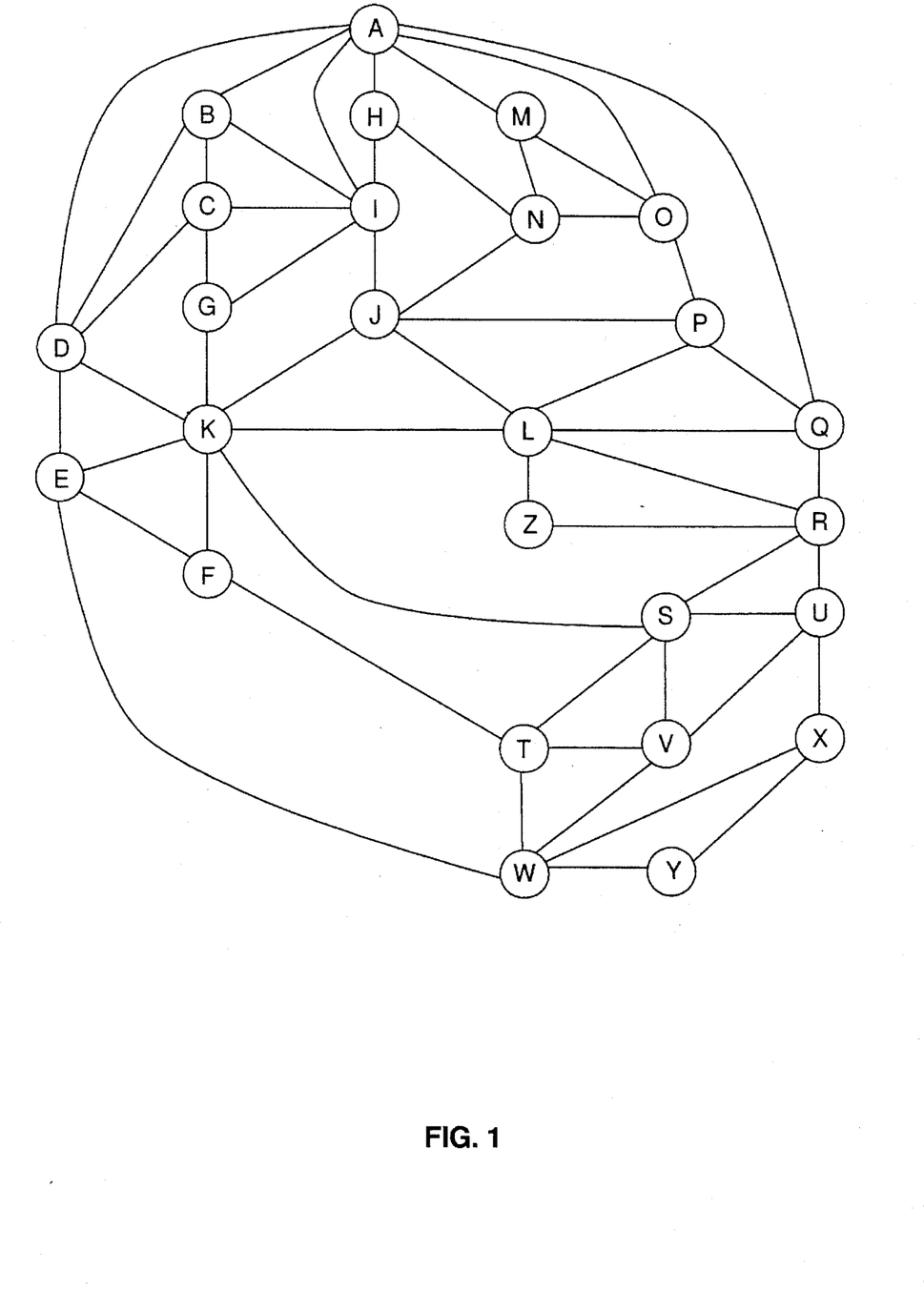
FIG. 1 is a schematic illustration of a conventional data network wherein the present invention would be implemented.

FIG. 1 illustrates a data network comprising a number of network nodes A through Z. The network nodes are interconnected by links for the transmission of data packets and other signals, such as control data, between nodes. Each link of the network connects two neighboring nodes. Preferably each link of the network, in fact, comprises a pair of unidirectional links (dual link segments) and each such pair of links can be realized either by a single communication medium, such as an optical fiber, or by two separate communication mediums, such as a pair of coaxial cables or optical fibers.

Such an organized network structure enables data to be communicated between any pair of nodes including a so-called source node and a so-called target node. The source and target designations are dynamic, varying according to the direction of the traffic, which adds to the complexity of the network architecture.

An optimized network organization, which might in some instances be devoted to control traffic, has already been disclosed in the art. One such organization is referred to as a so-called spanning tree architecture.

Figure 2:
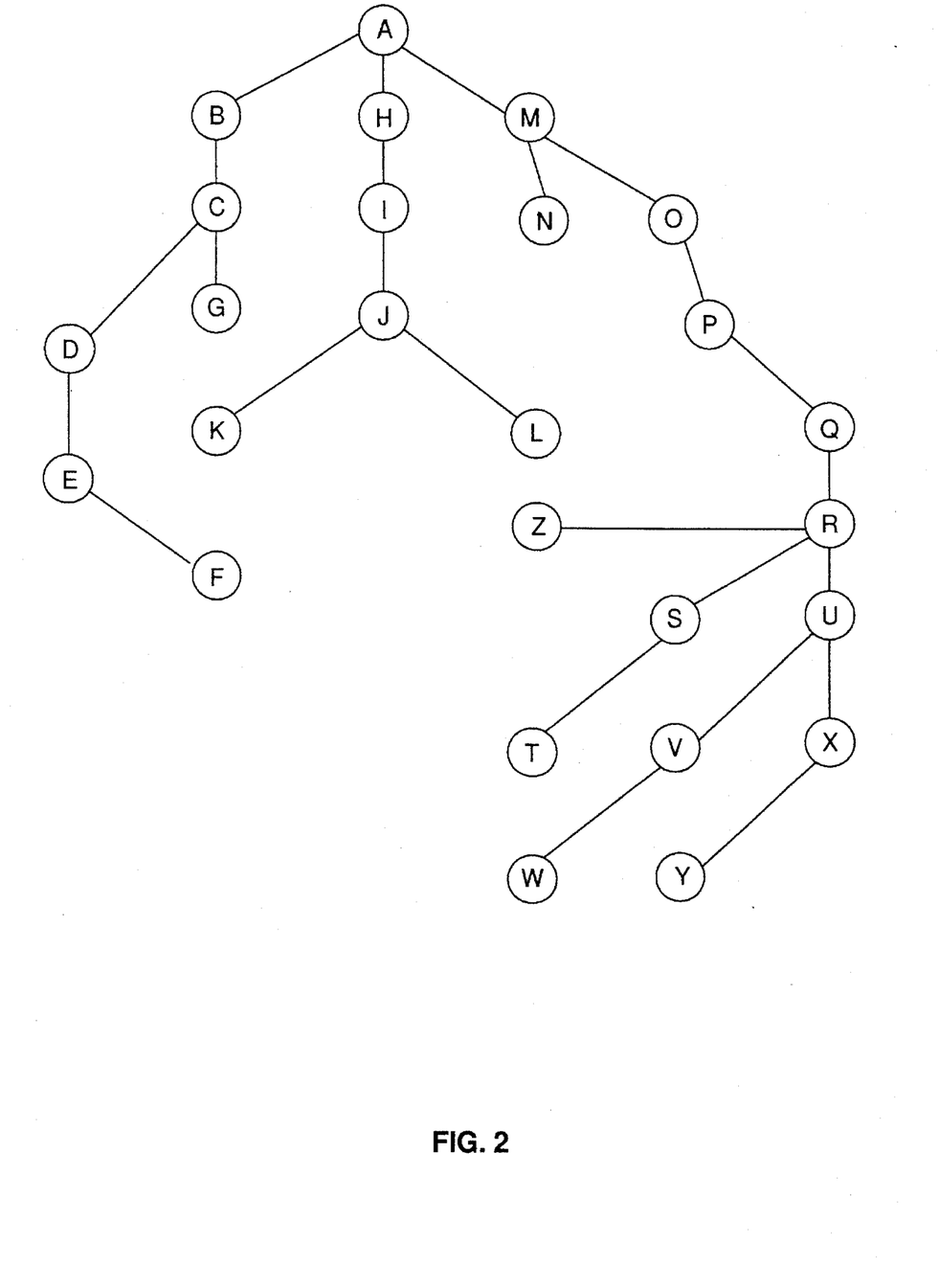
FIG. 2 is a schematic representation of a spanning tree derived from the data network of FIG. 1.

FIG. 2 depicts a spanning tree, i.e. an optimal structure, that enables the efficient transmission of a message (e.g. data or control) from any node of the communication network to any other node. The spanning tree contains the links needed to interconnect all nodes without any cycles or loops. The links may be considered as extending outward from one node (e.g. node A in FIG. 2) referred to as the root node. The terminating nodes of the spanning tree (e. g. node F, node G, node K, node L, node N, node Z, node T, node W and node Y) are referred to as leaf nodes. The nodes between the leaf nodes and the root node are referred to as intermediate nodes. It should be noted that, in the structure of the network of FIG. 2, any one of the nodes A through Z might be a root node for a specific spanning representation.

In such a tree structure, the root node is designated through a procedure using both hardware and software means distributed within the network. The links connecting pairs of nodes of the spanning tree are sometimes referred to as "edges".

The root node is also referred to as the parent node of the nodes directly connected to it. All nodes connected directly to the root node are referred to as children nodes of the root node. In an outward progression along the tree structure, each node that is directly connected to another node that is closer to the root node is referred to as the child node of the latter (parent) node. Thus, for instance, with the spanning tree structure shown in FIG. 2, node A is the parent of nodes B, H and M; node B is the parent of node C; node C is the parent of nodes D and G. Conversely nodes D and G are both children nodes of node C. In other words, given a spanning tree structure, the root node is the only node with no parent node. Apart from this characteristic, the root node is not necessarily different from any other node of the spanning tree. Consequently, any one of the nodes A through Z may operate as the root node under certain network conditions.

Obviously, under normal operating conditions, several situations may occur that require reorganization of a spanning tree. For instance a new link may be installed for the purpose of optimizing the flow of network traffic (e.g., a low speed or low capacity link may be replaced by a higher speed or higher capacity link) or to add a new path between nodes. Link replacement should, naturally, be implemented as quickly as possible to avoid network traffic degradation between the time the old link is removed and the new link is available.

If a terminal attached to one node requests access to a CPU (Central Processing Unit) attached to another node, the system should simply and quickly select the path between those two nodes. The faster the path is selected, the better in terms of efficient network operation.

The importance of being able to rapidly reorganize a spanning tree in a modern data network becomes more apparent when it is realized any failure (e.g. link failure) will isolate at least a portion of the tree and completely disrupt the traffic therein, if not in the whole data network.

These situations have already been considered in the prior art but the solutions proposed are not considered fully satisfactory in terms of time required for reorganizing a spanning tree.

OBJECTS OF THE INVENTION

One object of the present invention is to provide a data communication network architecture and more particularly a derived spanning tree representation which permits fast spanning tree reorganization under most operating conditions.

Another object of this invention is to provide a node organization and corresponding means for enabling node self-initialization after any tree modification.

Still another object of this invention is to provide a method and means for fast selection of a requested path between two nodes of the spanning tree.

A further object of this invention is to provide a method and means for rapidly reorganizing a spanning tree under a number of operating conditions, including the case of link failure.

Another object of this invention is to provide a method and corresponding means for enabling fast spanning tree recovery even in case of multiple link failures.

SUMMARY OF THE INVENTION

These objects are achieved in a data communication network including several nodes interconnected by bi-directional links for enabling the transmission of data packets and control data between the nodes. The nodes, at any given moment, are organized into a spanning tree including, a root node and children nodes organized in a parent-children relationship, with each node (except the root node) having a single parent node. Each node is provided with storage means for storing a topology database including a Parent Table, all the nodes of the tree, with each node (except the root node) pointing to its parent node and to a Link Table via out-link pointers, the Link Table including dual link pointers for pointing to respective dual links within the Link Table and means for assigning each link reference with a bit position indicating whether said link currently participates to the spanning tree or not; means for using the Parent Table and Link Table contents for organizing the tree arrangement at will; and means for dynamically updating the node topology database including the Parent Table and the Link Table upon each spanning tree (re)organization.

These and other objects, characteristics and advantages of the invention will become apparent from a consideration of the following detailed description given when read with reference to the accompanying drawings, which specify and show preferred embodiments of the invention.

DETAILED DESCRIPTION

The following description assumes a general data network as represented in FIG. 1 wherein, at a given time, certain links might be operating while others are not. A corresponding spanning tree is represented in FIG. 2 with illustrated edges or links connecting the nodes A through Z at the given time.

The network representations of both FIGS. 1 and 2 are provided to illustrate this invention and should in no way be considered as limiting the scope of this invention. The invention may be implemented in networks that are more complex or simpler than that shown in the figures. Also, the distances between nodes may vary from relatively small distances, to relatively large distances (e.g., thousands of kilometers).

It should also be understood that terminals (not represented), including both conventional data terminals and mainframes or CPUs, are attached to given nodes to request and control data traffic using conventional log-on procedures. Those procedures will not be described herein as they do not directly participate in the invention.

Finally, the network nodes and links are not necessarily equivalent to one another in terms of power, speed traffic capacity, etc... but this does not interfere with, or affect, the invention.

Also, parent, child and root relationships are defined as described above and the spanning tree representation may, and probably shall, vary over time, with any one of the nodes potentially becoming the spanning tree root.

As already mentioned, data and control information is to be routed throughout the network. Such information, generically referred to as data, includes both pure data and control data, organized into a conventional packet structure. Each packet includes a header section having routing information (addresses) to be used by the network to direct the packet through the network from a source to an assigned target, via network links and intermediate nodes.

Some packets may be broadcast or multicasted to several nodes concurrently. In other words, a multicast routing node enables a packet to be sent from one node to several receiver nodes simultaneously. The sending node and the corresponding receiving nodes act as a multicast tree. One may consider that a tree address is associated with a multicast tree once the tree has been defined. The various network nodes specify which of their associated links (defined in terms of link ownerships) are on the multicast tree by setting the appropriate tree address in the link hardware.

Packets transmitted in the network may contain a tree address in their routing header. Those packets are propagated in the network only on links which are part of the multicast tree and have the right tree address set in their hardware.

Figure 3:
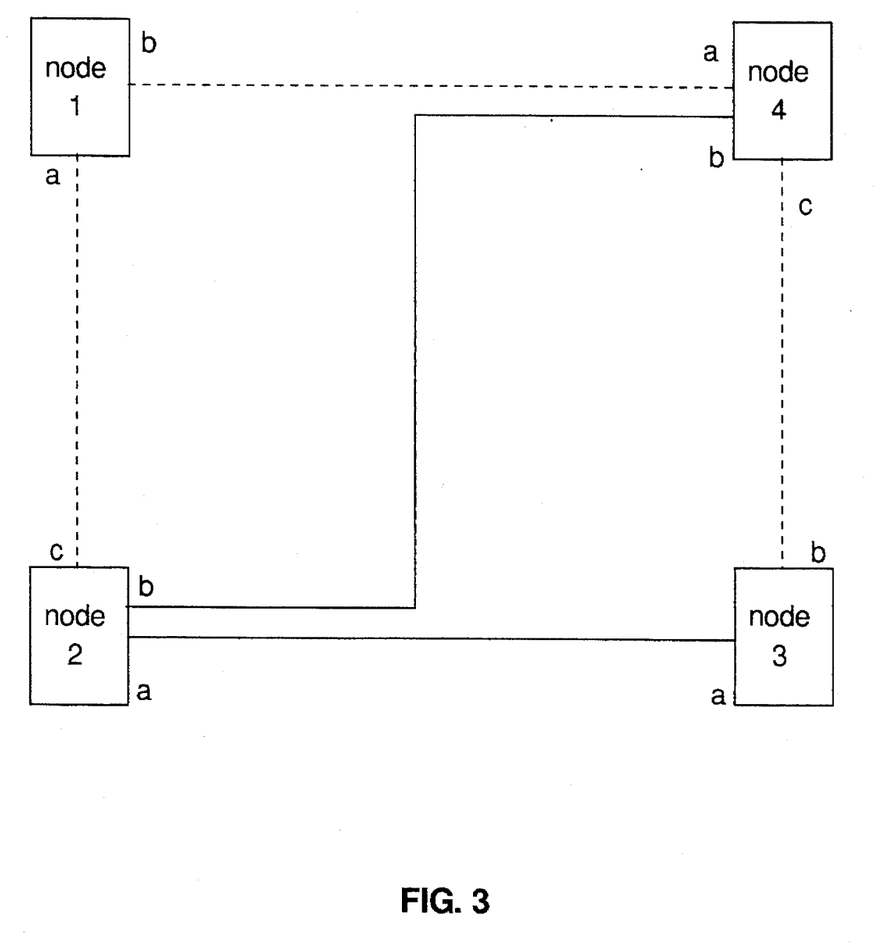
FIG. 3 is a schematic representation of a network tree for multicast operation.
Figure 4:
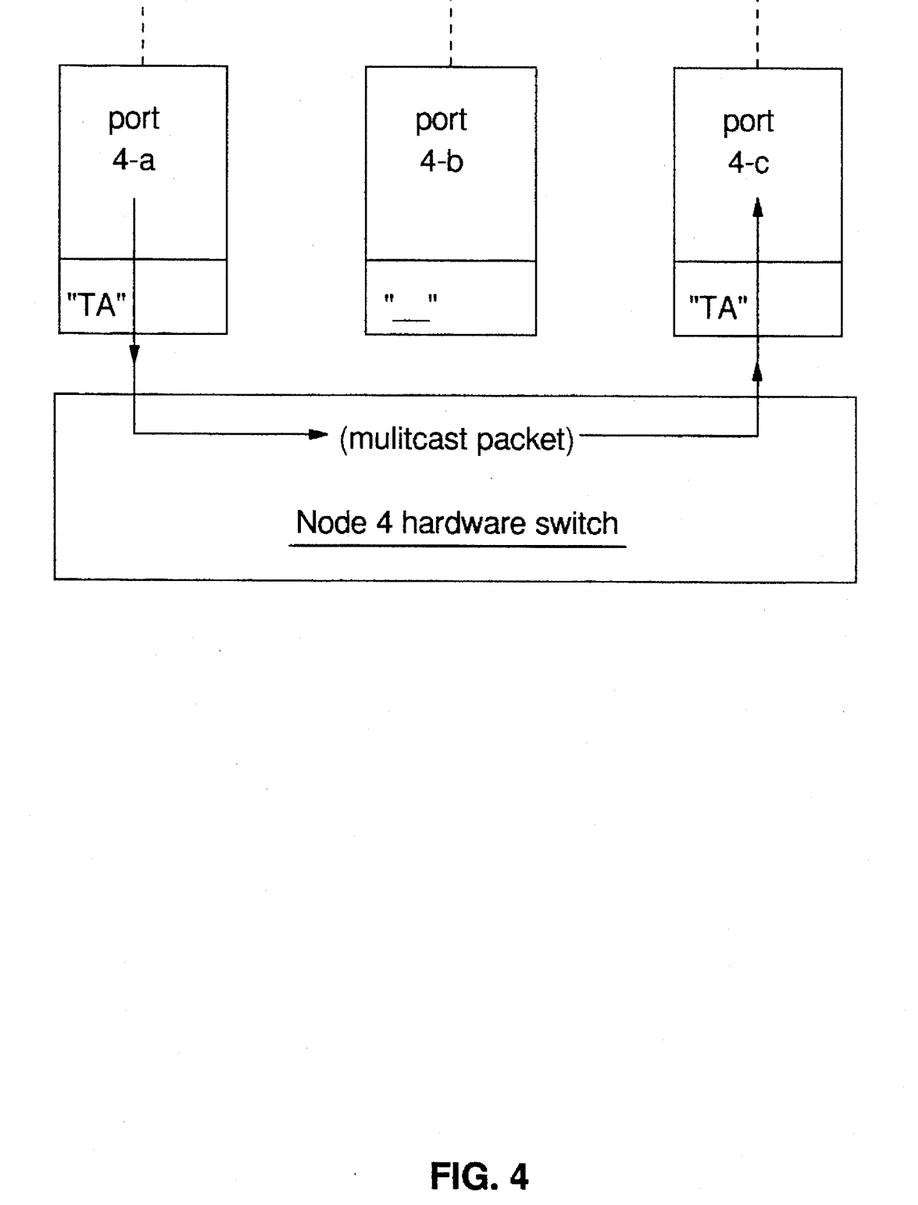
FIG. 4 is a schematic representation of the hardware involved in the operation of one of the nodes of the network tree of FIG. 3.

An example of multicast tree organization and multicast routing is illustrated in both FIGS. 3 and 4. Represented in FIG. 3 is a network including four nodes labeled nodes 1, 2, 3 and 4 respectively. Those nodes are interconnected by physical links, each link consisting of two unidirectional links. Each unidirectional link is defined by (one may say "belongs to") its origin node. Conversely, the node is said to "own" links. Accordingly: Node 1 owns two links—links 1-*a* and 1-*b*; Node 2 owns three links—links 2-*a*, 2-*b* and 2-*c*; Node 3 owns two links—links 3-*a* and 3-*b*; and Node 4 owns three links—links 4-*a*, 4-*b* and 4-*c*.

As represented in FIG. 3, the link 4-*a* is said to be the dual link of link 1-*b*, with both links forming a complete bidirectional physical link between Node 1 and Node 4.

One possible multicast tree connects the four nodes through the dotted links. This multicast tree is identified by a preassigned tree address "TA". When node 1 sends a packet with the address TA in its routing header section, the packet is automatically sent on link 1-*a* and link 1-*b*, then routed from node 4 to node 3 via link 4-*c*. Only those links that are part of the multicast tree will propagate the packet. The packet from node 1 is said to have been broadcast to nodes 2, 3 and 4 via the multicast tree as required.

FIG. 4 is a schematic representation of switching hardware supporting the multicast tree "TA" in node 4. The node 4 is provided with a number of ports corresponding to each link attached to node 4, i.e. port 4-*a*, port 4-*b* and port 4-*c*. Each port is provided with a buffer for storing the multicast tree address. A packet is multicasted only through those ports (excluding the input port) having a stored multicast tree address matched by a corresponding tree address in a packet header.

When a packet with a "TA" field in its routing header is received in node 4, the node's internal switch hardware copies the packet to all links marked as being part of the "TA" multicast tree, except the link on which the packet arrived on the node. In the represented case, the packet is forwarded to link 4-*c*.

A Spanning Tree (ST)is an example of a multicast tree that joins all the nodes in a network (see FIGS. 1 and 2). Any packet sent by a node and carrying the Spanning Tree address in its routing header section, shall automatically be sent to all other nodes of the network by using the above described multicasting process and hardware.

This mechanism is particularly useful for propagating network control messages that must reach quickly all network nodes without being transported on each and every link of the original data communication network, which would result in the message being received more than once by many of the nodes. The spanning tree insures that a message sent by a sender node on the spanning tree is received only once by each receiver node belonging to the spanning tree.

In the present invention, each node includes means for storing a full spanning tree representation or topology database and means for dynamically readjusting this full topology representation in a very fast manner. To that end, each node is provided with software means, which, using conventional and preexisting processor means and random access memory means, as well as hardware and logic of FIG. 3 and 4 as already described, to organize and maintain the spanning tree representation to enable optimal operation of the network.

More precisely, each node is provided with Control Point Adapter logic including control unit and random access memory means wherein a topology database will be stored. The topology database shall list the network nodes, with each node entry designating a parent node and including an out-link pointer pointing to an outlink table. The outlink table will, in turn, include dual link pointers pointing to a dual link table as well as a bit position (ST bit) indicating whether the considered link is, actually, on the spanning tree (ST) or not.

For instance, consider Node C. Assuming the network topology shown in FIG. 1, Node C's topology database will include, as does each other node, a parent table (node list) stored therein. The outlink table will list in node list form, all network nodes. Each network node entry in the table will include a pointer to the parent node for the network node. Each network node entry will also point to an out-link table listing the node links. For instance, Node C shall point to a list including CB, CD, CG and CI (those same links are linked together with CB connecting to CD, CD connecting to CG and CG connecting to CI.

The out-link table also includes indications as to whether the listed links belong to the actual spanning tree or not. As mentioned a single bit (ST) is sufficient to provide this indication. If an ST bit is set to a binary value "1", this indicates that the associated link belongs to the spanning tree. If ST equals "0", the link is off the tree. For example, given the spanning tree representation of FIG. 2, ST=1 for links CB, CD and CG, and ST=0 for CI.

Each link of the out-links table points to a second or dual link table identifying the outbound link from the node at the opposite end of the specified link. For instance, CB shall point to a list including BC, BI, BA and BD. Obviously, due to the duality context, BC in the second table shall include a pointer pointing back to CB in the first list. The second list also mentions whether each link on the second list is on the spanning tree or not. ST bit is accordingly set to "1" in front of BC and BA, while it is at the binary value zero in front of BI and BD.

Each link entry within said second list points to a third dual list of links from nodes at the opposite ends of each link on the second list. For instance BA shall point to a third list including AD, AB, AI, AH, AM, AO and AQ. The following links in said third list will show an ST bit set to the binary value 1, i.e. AB, AH and AM, while ST=0 for the remaining links.

Figure 5:
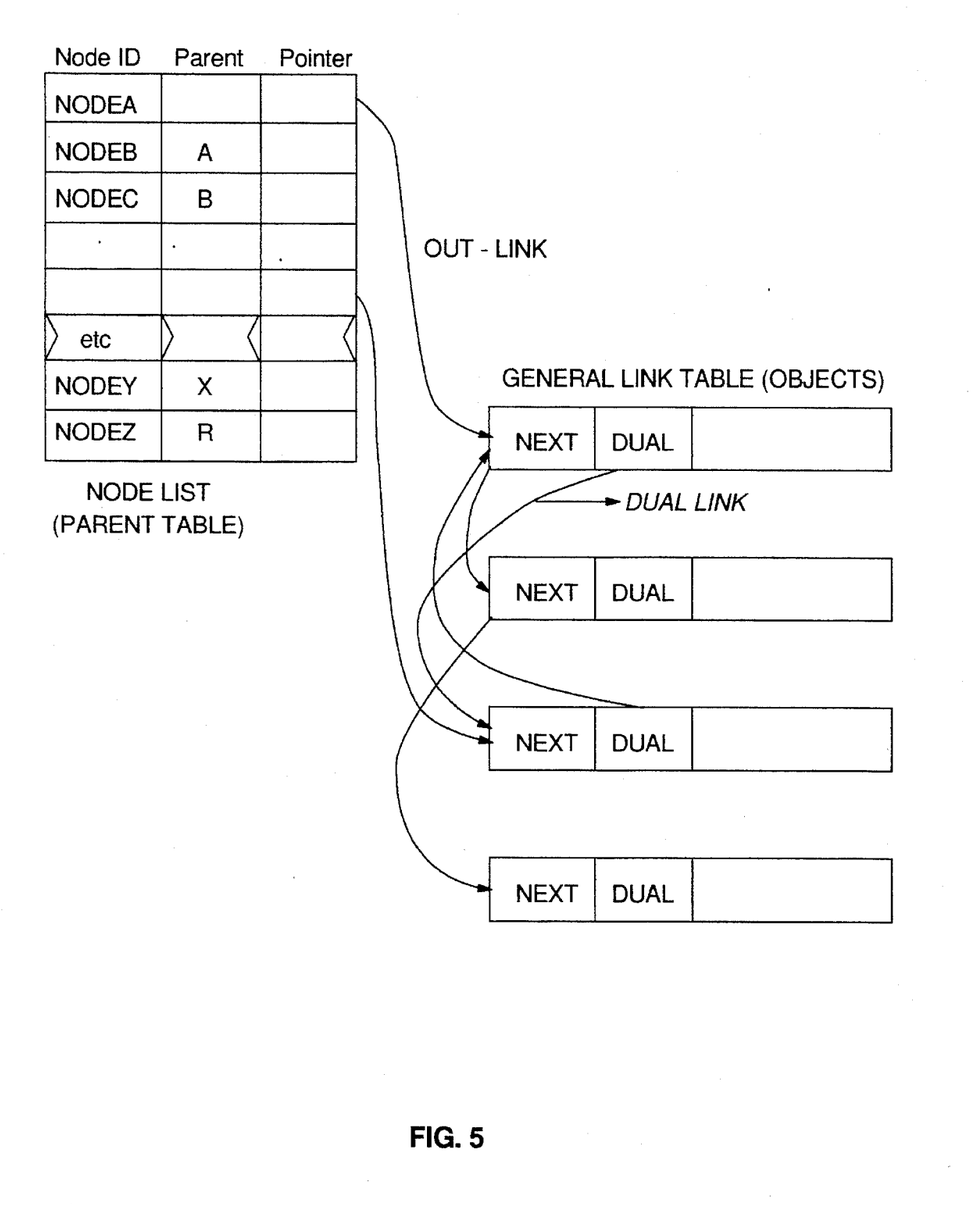
FIG. 5 is a schematic representation of a node organization which supports the invention.

The hierarchical link listing will expand until the network has been entirely described. (All these link tables or lists may, in practice be combined into a single LINK TABLE). The parent table contents are node dependent as the table represents a view as seen from a particular node, but also each table includes a full tree representation including each and every node's parent. Those tables might in fact be combined into a topology database schematically represented in FIG. 5.

Figure 6:
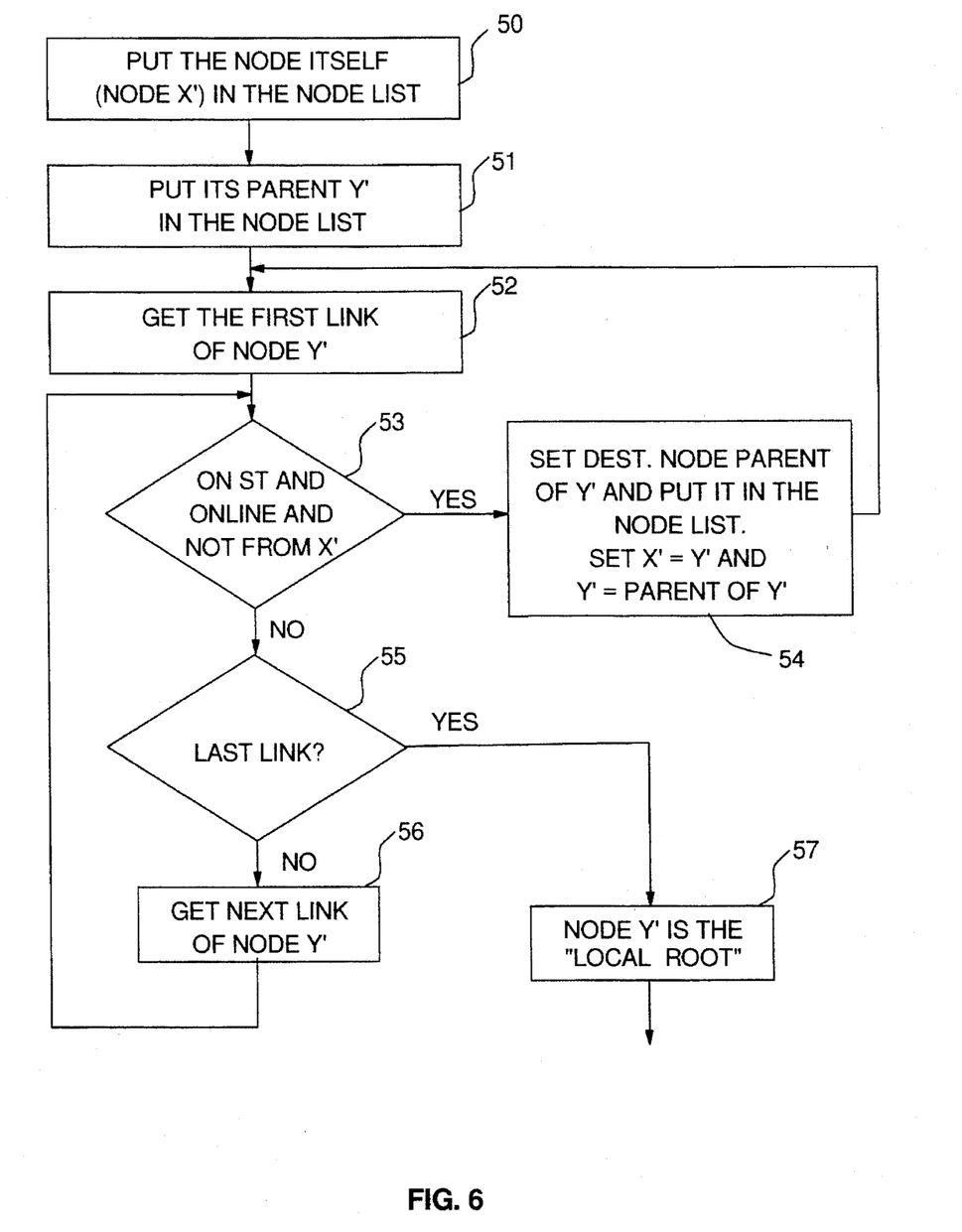
FIGS. 6 and 7 (including FIG. 7.1 through 7.3) are flow charts for implementing the invention.
Figure 7A:
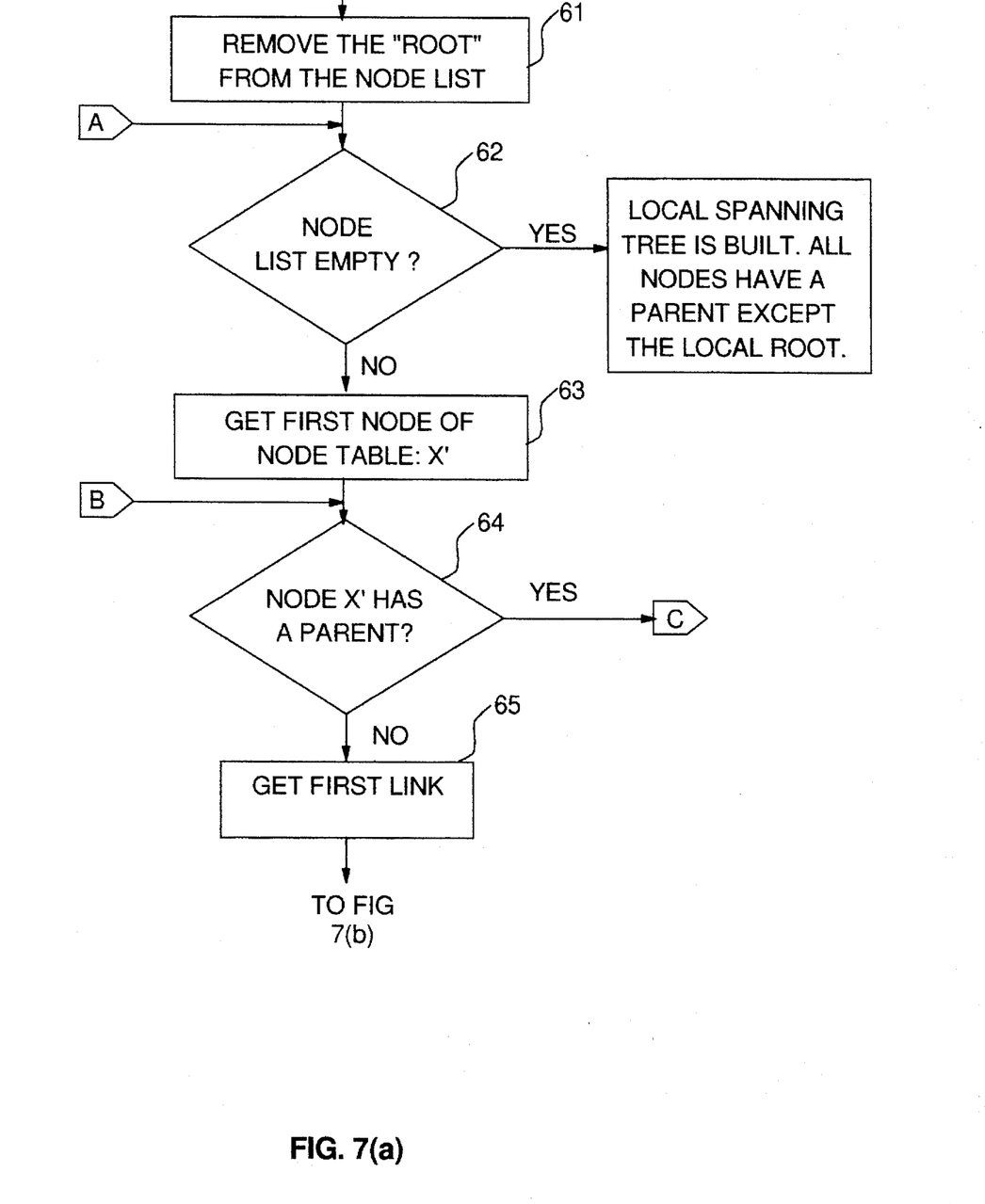
Figure 7B:
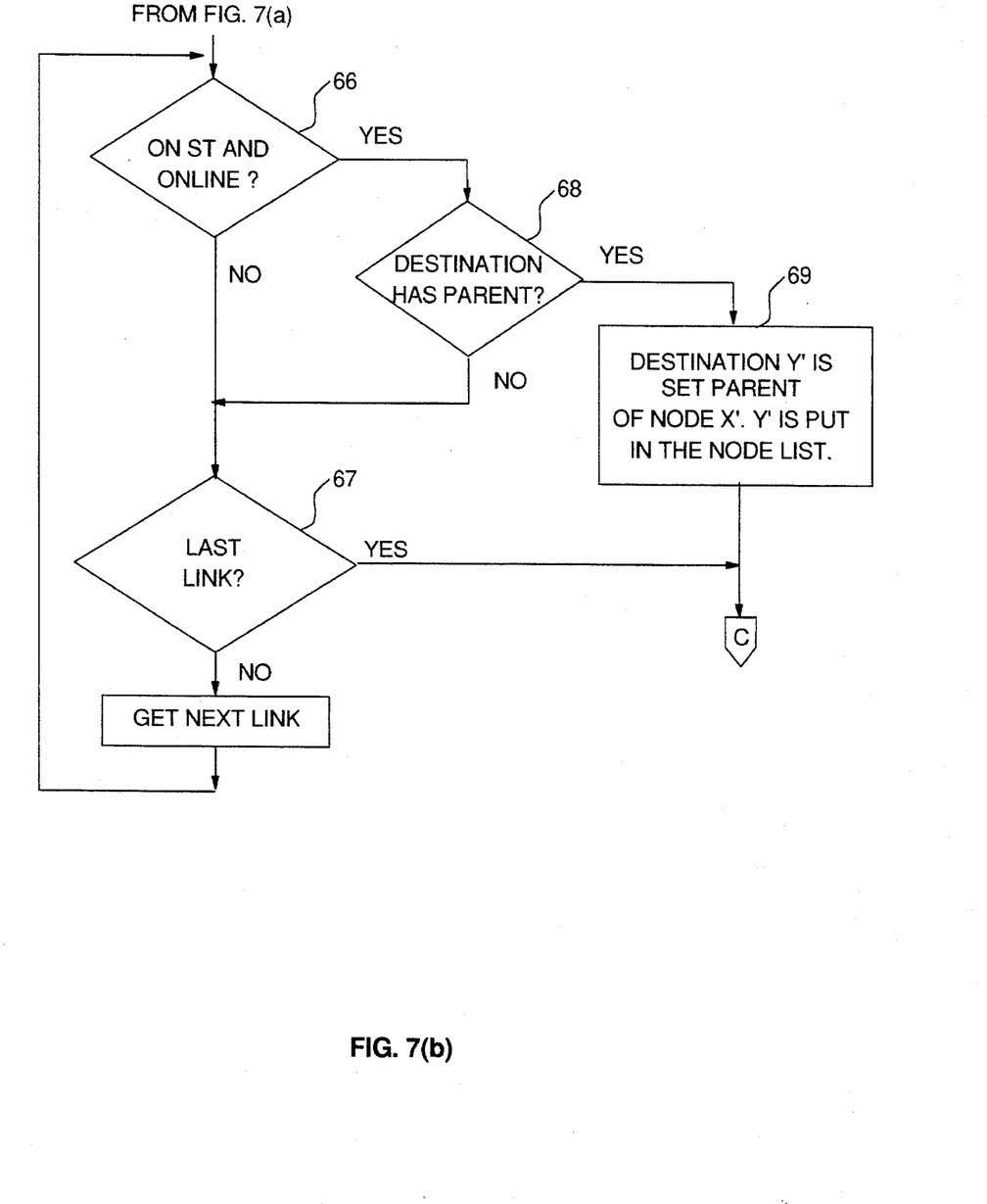
Figure 7C:
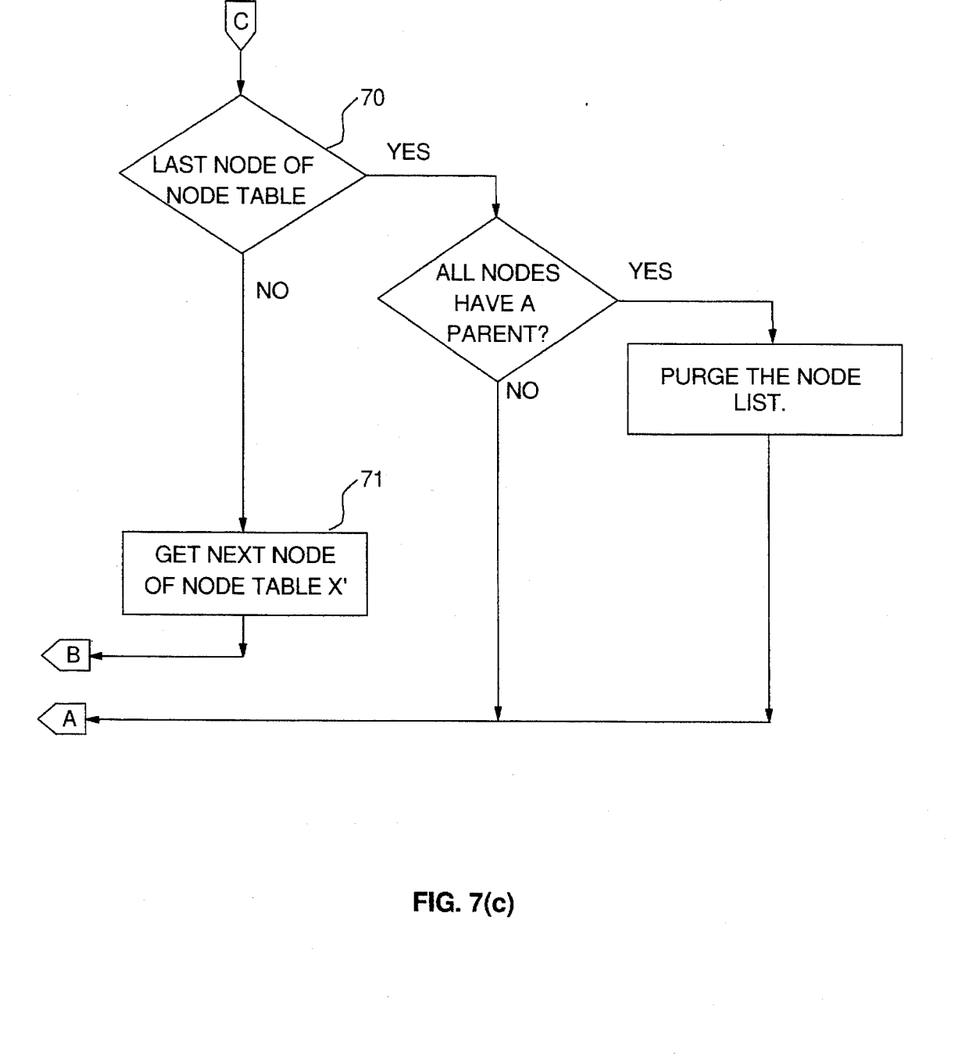

FIGS. 6 and 7 are flow charts of processes for building a local Spanning Tree representation. FIG. 6 describes how to determine the root of the local image of the Spanning Tree. The local root is the first terminal node (node with no other child node) encountered when selecting successive parents.

Assume the process is started at a given node X'. The process starts with step 50 whereby the given node X' is itself entered in the node list. Then, in step 51, a corresponding parent node Y' is entered into the node list. Using the existing topology database and network spanning tree the system identifies first link of Node Y' (step 52) and performs a check (step 53) whether the identified link is on the Spanning Tree and is on-line and does not come from node X'. If the result of the tests of step 53 is positive, the node at the opposite end of the identified link is identified as a parent of Y' and this status is recorded in the node list. X' is set equal to Y' and new node is made parent of Y' (step 54). The process then loops back to step 52.

Should, on the contrary, the result of the test of step 53 be negative, a second test is performed (step 55) to determine whether the link under consideration was the last link for the node. If more links to the node remain, the system then considers next link of node Y' (step 56). Otherwise, the process proceeds to step 57 and Node Y' is recorded as being the local root.

The process then goes to FIG. 7 representing the algorithm for scanning the node table and database to update the corresponding parent information. The root node is first removed from the node list (step 61), and a test is performed to check whether the node list is empty (step 62). Should this be the case, the local spanning tree is fully formed, with all nodes, but the local root, having a parent node defined and recorded. Otherwise, the process reads the first node of the node table (e.g. Node X') (step 63) and a test is performed to check whether this node X' has a parent node (step 64). Should the answer be negative, the process identifies a first link to node X' (step 65) and tests whether this link is on the spanning tree (ST=1) and is currently on-line or available (step 66). If the answer to step 66 is negative, a check is performed (step 67) to see whether the link under consideration is the last link to node X' to be considered. If this is not the case, the next link is selected and the process loops back to step 66. In case of a positive answer at step 66, the system examines whether the node at the other end of the link under consideration has a parent (step 68) and if not, the system looks for another link in step 67.

Otherwise, the destination node (say Y') is set as being the parent of node X', and Y' is recorded in the node list (step 69). Should the results of either of tests 64 and 67 be positive, and upon completion of the operations of step 69 as well, another test (step 70) is performed to check whether the considered node was the last node to be scanned in the node table.

In case of negative answer to this last test, the system scans the node table to identify its next recorded node (step 71) and the process loops back to step 64. Otherwise, the system checks whether all nodes have a parent (step 72), and if not, loops back to step 62, if all nodes have an identified parent, otherwise, the node list is purged and the process loops back to the same step 62.

As already mentioned, the full local tree representation provided by this invention improves the network and spanning tree operations in a number of critical situations, by greatly simplifying and speeding-up the resolution of any corresponding problem.

Consider the case where a path is to be quickly determined between a source node and a target node, using only the spanning tree edges (links). A fast path determination is initiated by the system. This operation is performed by exploring the source node topology database, up to the root node, for both the source node and the target node, listing all target's parent nodes up to the root node and all source's parent nodes up to the root node. The first common node on the two lists defines the path.

As an example, assume the source node Z wishes to establish a spanning tree path to target node X.

Referring to the spanning tree shown in FIG. 2, the logic set within node Z will scan the local Table and establish the following lists (see FIG. 2):

source-parent-list=Z, R, Q, P, O, M, A.

target-parent-list=X, U, R, Q, P, O, M, A.

Then the system proceeds with a reverse scanning of both lists above, deleting all common nodes but the last. Consequently, on both lists, A is first deleted, then M, O, P and Q. The last common node being R, Node Z will set the path looked for and define it in a control message, as being Z, R, U, X by locally scanning the remaining source list forward and target list backward.

But the present invention is even more important in situations wherein a link becomes unavailable and the spanning tree must be redefined very quickly. With the full tree representation provided by this invention in topology databases at each node, the system can recover quickly from edge (link) failures. The distributed tree maintenance algorithm disclosed above defines a unique node called the root. The root centralizes and coordinates most of the maintenance of the spanning tree.

When an edge failure occurs, the original spanning tree is partitioned into two trees. A node that was a child before the failure may now become a root (node with no parent) of a newly created tree partition. With the information and systems already existing at each node, the nodes in each partition may try to define a spanning tree for their partition. Ultimately, any spanning trees for the two partitions should be merged into a unique single tree again bypassing the failed link. In order for the two partition spanning trees to merge, their respective roots must agree on a single edge at which they should be interconnected. A method for updating a spanning tree after network topology changes (link and node failures and recoveries) was described by Israel Cidon, Inder S. Gopal, Shay Kutten and Marcia Peters, in the IBM Technical Disclosure Bulletin Vol 35 No 1A, June 1992, pages 93–398, in an article having the title "Distributed Tree Maintenance". In that article, the topology maintenance algorithm ensures that nodes on a tree eventually know the topology of their neighboring edges. Agreement between root nodes for interconnecting is ensured through a property called "weight" assigned to all network edges in a unique manner, such that they can be strictly ordered. For two trees to merge, each tree's root must agree on the non-tree edge between them with the lowest weight. Then the root moves from one node to another via a reliable point to point message called Move-Root. The only node that can send Move-Root is the current root. Upon sending the Move-Root message, the current root is no longer the root. The receiver of Move-Root becomes the next root. The topology update and tree maintenance algorithms are interdependent, in that the current root considers all the edges in the network to determine where to move the root.

The full knowledge of tree topology, and more particularly the knowledge of node's parentships in each node as provided by this invention combined with the fast path determination derived therefrom, as described above, enables faster tree recovery. This process, named fast spanning tree recovery to be initiated by the system shall be described hereunder and illustrated in one example.

Assume the edge BC fails. The original tree (see FIG. 2) is now partitioned into two trees, the original one (Tree (A)) excluding nodes C, G, D, E and F, and a new tree including only those nodes C, G, D, E and F. By definition, the child node at the failing edge, that is node C, is assumed to be the root for the tree including nodes C, D, E, F, and G. This second tree may be labelled Tree (C).

When the process for merging the two partitions, i.e. Tree (A) and Tree (C) starts with Node C scanning its topology database. The database is represented schematically hereunder and shows the Parent Table and the Link Tables which, in fact, could be easily combined into a single Link Table.

The Parent Table at Node C lists all the network nodes and, for each node, the corresponding parent node. Thus, prior to the link failure, Node A, being the root, is the only node without a parent. Node B's parent is A, Node C's parent is B, and so-on down to node Z. The Parent Table is therefore as follows prior to the link failure:

| PARENT TABLE | | | | |
|---|---|---|---|---|
| Node | : | Parent | : | Out-link Pointer |
| Node A | : | Void | : | |
| Node B | : | A | : | |
| Node C | : | B | : | → to Link Tables |
| : | | : | | : |
| Node X | : | U | : | |
| Node Y | : | X | : | |
| Node Z | : | R | : | |

As indicated, the Parent Table also includes an out-link pointer for each listed node, the pointer pointing to the links connected to the listed node (first list), with each link list in turn pointing to a dual link list (second list, third list, etc ...)

Consider one example with a first list showing the out-links from node C, a second list showing the dual list pointed to by CB dual PTR, and a third list pointed to by BA dual PTR.

| LINK TABLE | | | | |
|---|---|---|---|---|
| First List | Links | Links Pointers | Dual PTR | ST bit |
| : | : | : | : | : |
| | CB | : | : | : | 1 |
| | CD | : | : | : | 1 |
| | CG | | | | 1 |
| | CI | | | | 0 |

-continued

LINK TABLE

Second List                           ST bit

| | BC | | | | 1 |
|---|---|---|---|---|---|
| | BI | | | | 0 |
| | BA | | | | 1 |
| | BD | | | | 0 |

Third List                            ST bit

| | AD | | | | 0 |
|---|---|---|---|---|---|
| | AB | | | | 1 |
| | AI | | | | 0 |
| | AH | | | | 1 |
| | AM | | | | 1 |
| | AQ | | | | 0 |

As shown above, the out-link pointer in front of Node C reference, points to the first link list listing including CB, CD, CG and CI, each pointing to the next link (not shown in the above tables). In other words, CB points to CD which in turn points to CG, and so-on until CI. In addition and as mentioned, the first link list includes dual-link pointers pointing to the second link list. For instance, the dual pointer associated with CB in the first link list points to the dual list (or second link list) listing the following links: BC, BI, BA and BD. Each link reference in said second Link List, in turn points third link list, and so on, as shown for link BA dual pointer. All these link lists are, in practice, combined into a single complex Link Table.

In addition, and this should help in the link failure recovery as mentioned, each link is defined with a one bit reference (i.e. ST) indicating whether the corresponding link is currently on the spanning tree (ST=1), or off the spanning tree (ST=0). For instance, for the original tree as represented in FIG. 2, and for Node C the first Link List shall indicate ST=1 CB, CD, CG and ST=0 for CI.

Once the link BC/CB fails, as mentioned above, Node C, i.e. the child node on the failing edge, becomes a root node for the tree including C, G, D, E and F. Only those links on Tree(C), i.e. CG, CD, DE, EF keep an ST bit equal to binary value 1. The others are reset. The above first table then looks as follows

| Link | : | : | ST |
|---|---|---|---|
| CB | : | : | 0 |
| CD | : | : | 1 |
| CG | : | : | 1 |
| CI | : | . | 0 |

The Parent Table is also reset to reflect the link failure and tree partitioning. Given the above information, just by scanning its topology database, and particularly by scanning the Link Table, Node C shall determine the list of links XKn, where Kn is a node belonging to Tree (A). In the example above the list of links CKn, shall only include CB and CI as links not belonging to Tree (C) and therefore potentially usable for interconnecting both Tree (A) and Tree (C).

Since CB is failing, the list of remaining links includes only CI and CI shall be designated for selection. More generally speaking, the list of CKn might include several links. In this case, an additional parameter would be predefined (e.g. highest speed link) to resolve the ambiguity and select the most appropriate link from multiple possible links.

Consequently the link selected by Node C is CI. Node C starts a dialog with node I by sending a so-called "Combine Request" message. Node I, can, however, respond only if it is the new root for what had been Tree (A). To avoid waiting indefinitely for node I to become the root, in case a problem occurs. Node C sets a timer and waits only for the duration of the set time.

Using a similar process (Table resettings, etc . . . ) on Tree A, original root node A also selects a link to be used to connect the two partitioned trees. In other words, once receiving the message that link BC failed, the original root (A)scans its topology database to find the list of candidate links KnC where Kn is a node belonging to Tree (A) after the tree split occurred, i.e. the tree including all the network nodes but C, G, D, E, F.

The same link IC among the set of CKn should be selected by both the root nodes A and C in the two partitions.

An immediate Move Root may then be implemented from node A to node I by using the fast path determination procedure of this invention as described above (just through parent lists scanning). Node A issues a Move-Root message to node I using the selected path on the spanning tree between node A and node I. Once node I becomes the new root, it can respond to the "Combine Request" message received from Node C over CI and complete the merge process with C. Then the unified spanning tree is redefined according to the process described above, with Node I being the new tree root.

As already mentioned, the present invention should appear to be of particular interest in a number of other situations. For instance to reduce a given spanning tree diameter, or to replace a given low grade (or so-called low weight) link by a higher weighted link. In those instances, the full topology databases available in each node shall appear fairly convenient.

We claim:

1. In a data communication network having a plurality of nodes and a plurality of bi-directional links, each of said nodes being connected to at least one other node through one of said bi-directional links to enable data to be exchanged between the nodes, said network being defined by at least one spanning tree comprising a root node and one or more children nodes, each of said children nodes except the root node having a single parent node, a topology manager located in at least one of said nodes comprising:

a) a link table memory containing a link table for each node in the current spanning tree, each link table identifying the node with which the link table is associated and each of the links from the identified node to other nodes in the network, each link entry in a link table including a spanning tree entry which indicates whether the link is currently included in the current spanning tree, b) a parent table memory containing a node entry for each node in the current spanning tree, each node entry other than the entry for the root node further containing the address of the node's parent node, the address of the link table for the node and the identification of dual links which are common to the link table for the node and link tables for other nodes; and c) spanning tree update logic for updating the link tables and the parent table upon a change in network topology affecting the current spanning tree, said spanning tree update logic further including i) means for scanning the parent table memory to detect an entry identifying a first node for which no parent node is identified, said means assigning the root position in a new spanning tree to the first node, ii) means for reading the parent table and link table for the first node to identify at least one adjacent node which satisfies predetermined criteria for a parent node to the first node, marking the adjacent node as a parent to the first node and amending the parent tables and link tables accordingly, and iii) means for repeating the operations performed by said reading means with each identified adjacent node being assigned the role as a first node until all nodes have a parent and amending the parent tables and link tables accordingly.

2. A topology manager as defined in claim 1 further including route selection means for quickly determining a path between any two nodes on the spanning tree, one of said nodes being identified as a source node and the other being identified as a target node, said route selection means being located at the source node and comprising:

a) means for scanning the parent table memory to create a first list comprising nodes on the spanning tree beginning with the source node and ending with the spanning tree root node and a second list comprising nodes on the spanning tree beginning with the target node and ending with the spanning tree root node;

b) means for processing the first and second lists by eliminating the spanning tree root node from both lists and each succeeding child node until all nodes common to both lists have been eliminated except the common node closest to the source node on the first list and to the target node on the second list; and c) means for defining the route between the source node and the target node as the concatenation of the nodes remaining on the first and second lists.

3. In a data communication network having a plurality of nodes and a plurality of bi-directional links, each of said nodes being connected to at least one other node through one of said bi-directional links to enable data to be exchanged between the nodes, said network being defined by at least one spanning tree comprising a root node and one or more children nodes, each of said children nodes except the root node having a single parent node, a topology manager located in at least one of said nodes comprising:

a) a link table memory containing a link table for each node in the current spanning tree, each link table identifying the node with which the link table is associated and each of the links from the identified node to other nodes in the network, each link entry in a link table including a spanning tree entry which indicates whether the link is currently included in the current spanning tree, b) a parent table memory containing a node entry for each node in the current spanning tree, each node entry other than the entry for the root node further containing the address of the node's parent node, the address of the link table for the node and the identification of dual links which are common to the link table for the node and link tables for other nodes;

c) spanning tree update logic for updating the link tables and the parent table upon a change in network topology affecting the current spanning tree; and d) route selection means for quickly determining a path between any two nodes on the spanning tree, one of said nodes being identified as a source node and the other being identified as a target node, said route selection means being located at the source node and comprising i) means for scanning the parent table memory to create a first list comprising nodes on the spanning tree beginning with the source node and ending with the spanning tree root node and a second list comprising nodes on the spanning tree beginning with the target node and ending with the spanning tree root node, ii) means for processing the first and second lists by eliminating the spanning tree root node from both lists and each succeeding child node until all nodes common to both lists have been eliminated except the common node closest to the source node on the first list and to the target node on the second list, and iii) means for defining the route between the source node and the target node as the concatenation of the nodes remaining on the first and second lists.

4. A topology manager as defined in either of claims 1 or 3 further including fast recovery logic for recovering from network fragmentation resulting from a failure of a link forming part of an original spanning tree, the fragmentation resulting in a first set of nodes including an orphaned node which had been connected to the original spanning tree through the failed node and all nodes connected to that node directly or through intervening nodes and a second set of nodes including the original root node and all nodes still connected to the original root node directly or through intervening nodes, said fast recovery logic including:

a) means at one or more of the nodes in said first set of nodes for designating the orphaned node as the new root node for the first set of nodes;

b) means in both the new root node and the original root node for resetting the link tables to define a first spanning tree for the first set of nodes and a second spanning tree for the second set of nodes;

c) means in both the original root node and the new root node for identifying each remaining link between nodes in the first spanning tree and nodes in the second spanning tree and for selecting one of the remaining links to provide the new connecting link between the first spanning tree and the second spanning tree;

d) means for designating the node connected to the selected link in the first set of nodes as a new parent node through which the first set of nodes are to be connected to the second set of nodes.

5. For use in a data communication network having a plurality of nodes and a plurality of bi-directional links, each of said nodes being connected to at least one other node through one of said bi-directional links to enable data to be exchanged between the nodes, said network being defined by at least one spanning tree comprising a root node and one or more children nodes, each of said children nodes except the root node having a single parent node, a method of managing the topology of the network, said method being implemented in at least one node and comprising the steps of:

a) maintaining a link table for each node in the current spanning tree, each link table identifying the node with which the link table is associated and each of the links from the identified node to other nodes in the network, each link entry in a link table including a spanning tree entry which indicates whether the link is currently included in the current spanning tree, b) maintaining a parent table containing a node entry for each node in the current spanning tree, each node entry other than the entry for the root node further containing the address of the node's parent node, the address of the link table for the node and the identification of dual links which are common to the link table for the node and link tables for other nodes;

c) updating the link tables and the parent table upon a change in network topology affecting the current spanning tree; and d) quickly selecting a route between any two nodes on the spanning tree, one of said nodes being identified as a source node and the other being identified as a target node, said route selection steps comprising i) creating a first list comprising nodes on the spanning tree beginning with the source node and ending with the spanning tree root node and a second list comprising nodes on the spanning tree beginning with the target node and ending with the spanning tree root node, ii) beginning with the spanning tree node, eliminating the spanning tree root node from both lists and each succeeding child node until all nodes common to both lists have been eliminated except the common node closest to the source node on the first list and to the target node on the second list, and iii) concatenating the nodes remaining on the first and second lists to define the route between the source node and the target nodes.

6. For use in a data communication network having a plurality of nodes and a plurality of bi-directional links, each of said nodes being connected to at least one other node through one of said bi-directional links to enable data to be exchanged between the nodes, said network being defined by at least one spanning tree comprising a root node and one or more children nodes, each of said children nodes except the root node having a single parent node, a method of managing the topology of the network, said method being implemented in at least one node and comprising the steps of:

a) maintaining a link table for each node in the current spanning tree, each link table identifying the node with which the link table is associated and each of the links from the identified node to other nodes in the network, each link entry in a link table including a spanning tree entry which indicates whether the link is currently included in the current spanning tree, b) maintaining a parent table containing a node entry for each node in the current spanning tree, each node entry other than the entry for the root node further containing the address of the node's parent node, the address of the link table for the node and the identification of dual links which are common to the link table for the node and link tables for other nodes; and c) updating the link tables and the parent table upon a change in network topology affecting the current spanning tree, said updating step further including the steps of i) scanning the parent table memory to detect an entry identifying a first node for which no parent node is identified and assigning the root position in a new spanning tree to the first node, ii) reading the parent table and link table for the first node to identify at least one adjacent node which satisfies predetermined criteria for a parent node to the first node, marking the adjacent node as a parent to the first node and amending the parent tables and link tables accordingly, and iii) repeating the operations performed by said reading means with each identified adjacent node being assigned the role as a first node until all nodes have a parent and amending the parent tables and link tables accordingly.

7. A method of managing network topology as defined in claim 6 further including steps of quickly selecting a route between any two nodes on the spanning tree, one of said nodes being identified as a source node and the other being identified as a target node, said route selection steps comprising:

a) creating a first list comprising nodes on the spanning tree beginning with the source node and ending with the spanning tree root node and a second list comprising nodes on the spanning tree beginning with the target node and ending with the spanning tree root node;

b) beginning with the spanning tree node, eliminating the spanning tree root node from both lists and each succeeding child node until all nodes common to both lists have been eliminated except the common node closest to the source node on the first list and to the target node on the second list; and c) concatenating the nodes remaining on the first and second lists to define the route between the source node and the target nodes.

8. A topology manager as defined in either of claims 6 or 5 further including steps for recovering from network fragmentation resulting from a failure of a link forming part of an original spanning tree, the fragmentation resulting in a first set of nodes including an orphaned node which had been connected to the original spanning tree through the failed link and all nodes connected to that node directly or through intervening nodes and a second set of nodes including the original root node and all nodes still connected to the original root node directly or through intervening nodes, said steps including:

a) resetting the link tables to define a first spanning tree for the first set of nodes and a second spanning tree for the second set of nodes;

b) identifying each remaining link between nodes in the first spanning tree and nodes in the second spanning tree;

c) selecting one of the remaining links to serve as a new connecting link between the first spanning tree and the second spanning tree; and d) designating the node connected to the selected link in the first set of nodes as a new parent node through which the first set of nodes are to be connected to the second set of nodes in a new spanning tree including both said first set of nodes and said second set of nodes.

* * * * *